United States Patent
Van Rensburg et al.

(10) Patent No.: US 8,041,313 B2
(45) Date of Patent: Oct. 18, 2011

(54) SYSTEM AND METHOD FOR WIRELESS COMMUNICATIONS

(75) Inventors: Cornelius Van Rensburg, Wylie, TX (US); Shahab Sanayei, Plano, TX (US); Young Hoon Kwon, San Diego, CA (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 389 days.

(21) Appl. No.: 12/412,624

(22) Filed: Mar. 27, 2009

(65) Prior Publication Data

US 2009/0253387 A1 Oct. 8, 2009

Related U.S. Application Data

(60) Provisional application No. 61/042,682, filed on Apr. 4, 2008.

(51) Int. Cl.
*H04B 1/38* (2006.01)

(52) U.S. Cl. .................. 455/90.2; 455/562.1

(58) Field of Classification Search .............. 455/84, 455/90.2, 90.3, 561, 562.1
See application file for complete search history.

(56) References Cited

U.S. PATENT DOCUMENTS

| | | | |
|---|---|---|---|
| 7,274,330 B2 | 9/2007 | Lee | |
| 7,274,936 B2 * | 9/2007 | Zangi et al. | 455/442 |
| 7,373,176 B2 | 5/2008 | Chotkowski et al. | |
| 2004/0224637 A1 | 11/2004 | Silva et al. | |
| 2005/0014540 A1 | 1/2005 | Shim | |
| 2005/0057394 A1 * | 3/2005 | Lee | 342/374 |
| 2008/0020715 A1 * | 1/2008 | Zangi et al. | 455/73 |
| 2009/0147869 A1 | 6/2009 | Duan et al. | |

FOREIGN PATENT DOCUMENTS

| | | |
|---|---|---|
| CN | 1551519 A | 12/2004 |
| WO | WO 2007/023515 A1 | 3/2007 |

OTHER PUBLICATIONS

Baumgartner, T., et al., "Performance of Downlink Beam Switching for UMTS FDD in the Presence of Angular Spread," IEEE International Conference on Communications (ICC 2002), Aug. 2002, pp. 851-855, vol. 2, IEEE.

Liao, W.-J., et al., "A Novel Beam Switching Antenna using RF Switches," IEEE Antennas and Propagation Society International Symposium, Jun. 9-15, 2007, pp. 5865-5868, IEEE, Honolulu, HI.

(Continued)

*Primary Examiner* — Long Nguyen
(74) *Attorney, Agent, or Firm* — Slater & Matsil, L.L.P.

(57) ABSTRACT

A system and method for wirelessly communicating using beamswitching is provided. A communications system includes a high-power signal cable coupled to a signal amplifier, a radio frequency circuit coupled to the high-power signal cable, and a control unit coupled to the radio frequency circuit. The high-power signal cable conveys a transmission signal produced by the signal amplifier. The radio frequency circuit includes a plurality of antennas, a passive network having a plurality of output ports and a plurality of input ports, each output port coupled to an antenna of the plurality of antennas, and a plurality of switches coupled to the high-power signal cable, each switch coupled to an input port in the plurality of input ports. The control unit produces the control signal based on a specified coupling of the high-power signal cable to the passive network.

26 Claims, 9 Drawing Sheets

OTHER PUBLICATIONS

Love, D., et al., "On the Probability of Error of Antenna-Subset Selection With Space-Time Block Codes," IEEE Transactions on Communications, Nov. 2005, pp. 1799-1803, vol. 53, No. 11, IEEE.

Pedersen, K., et al., "Application and Performance of Downlink Beamforming Techniques in UMTS," IEEE Communications Magazine, Oct. 2003, pp. 134-143, vol. 41, No. 10, IEEE Communications Society.

Sanayei, S., et al., "Antenna Selection in MIMO Systems," IEEE Communications Magazine, Oct. 2004, pp. 68-73, vol. 42, No. 10, IEEE Communications Society.

Zeng, X., et al., "Performance Bounds for Space-Time Block Codes with Antenna Selection," International Symposium on Information Theory, ISIT Proceedings, Jun. 27-Jul. 2, 2004, pp. 339, IEEE, Chicago, IL.

* cited by examiner

SYSTEM AND METHOD FOR WIRELESS COMMUNICATIONS

This application claims the benefit of U.S. Provisional Application No. 61/042,682, filed on Apr. 4, 2008, entitled "One PA One Cable Beamswitcher," which application is hereby incorporated herein by reference.

TECHNICAL FIELD

The present invention relates generally to wireless communications, and more particularly to a method and apparatus for wirelessly communicating using beamswitching.

BACKGROUND

In general, wireless communications systems using beamforming make use of a number of transmit and/or receive antennas and signal processing to create fixed or adaptive transmit/receive beampatterns. The beampatterns may have a directional nature that may result in a performance improvement when compared with unidirectional transmit and/or receive antennas. The use of the beampatterns may yield a transmit/receive gain over wireless communications systems using unidirectional transmit and/or receive antennas.

In addition to increased computational requirements arising from the signal processing, wireless communications systems that use beamforming require multiple transmit and/or receive antenna. With each transmit and/or receive antenna, there is a number of electronic circuitry and components required to support the antenna, with a power amplifier (PA) used to amplify a signal to be transmitted and high-power signal cabling used to connect the PA to an antenna potentially being the most expensive. For example, the high-power signal cabling may be on the order of several inches in diameter to minimize signal loss.

The sheer physical size and weight of the high-power signal cabling may also present a problem with implementation. Typically, a communications tower may be owned by a tower company and leased to one or more service providers who install their communications equipment on and around the communications tower. Usually, a communications tower may be rated by weight loading and wind loading factors. Therefore, a communications tower may be capable of supporting a finite number of antennas, high-power signal cables, and so forth. For example, a communications tower may be capable of supporting 18 high-power signal cables. However, since the communications tower may be leased to three or more service providers, each service provider may only have six (6) high-power signal cables on the communications tower. Furthermore, given that most communications systems use sectored antennas (with three sectors being a commonly used number), each service provider may only have two high-power signal cables per sector. This may restrict the service provider to having only two transmit/receive antennas per sector or one transmit and one receive antenna per sector, which may limit the service provider's ability to use beamforming.

Therefore, there is a need to provide beamforming like performance improvements while minimizing the number of antennas, PAs, high-power signal cabling, and so forth, to reduce costs. Furthermore, by minimizing the number of antennas, PAs, high-power signal cabling, and so forth, existing communications towers may be used, further reducing the cost of implementing a wireless communications system.

SUMMARY OF THE INVENTION

These and other problems are generally solved or circumvented, and technical advantages are generally achieved, by embodiments of a system and method for wirelessly communicating using beamswitching.

In accordance with an embodiment, a communications system is provided. The communications system includes a high-power signal cable coupled to a signal amplifier, a radio frequency circuit coupled to the high-power signal cable, and a control unit coupled to the radio frequency circuit. The radio frequency circuit transmits and receives signals, and the radio frequency circuit includes a plurality of antennas, a passive network having a plurality of output ports and a plurality of input ports, each output port coupled to an antenna in the plurality of antennas, and a plurality of switches coupled to the high-power signal cable, each switch coupled to an input port in the plurality of input ports. The passive network provides a signal at an input port to an output port, and the plurality of switches selectively couples the transmission signal conveyed by the high-power signal cable to the plurality of input ports based on a control signal. The high-power signal cable conveys a transmission signal produced by the signal amplifier, and the control unit produces the control signal based on a specified coupling of the high-power signal cable to the plurality of antennas. The communications system is installed at least in part on a communications tower, with the radio frequency circuit installed at or near the top of the communications tower, and the signal amplifier installed at or near the bottom of the communications tower.

In accordance with another embodiment, a method for operating a base station in a wireless communications system having a mobile station is provided. The method includes setting a plurality of antennas in a widebeam mode, transmitting control information using the plurality of antennas, selecting a narrow beam setting for the plurality of antennas, setting the plurality of antennas in the selected narrow beam setting, transmitting a transmission using the plurality of antennas set in the selected narrow beam setting, and repeating the selecting a narrow beam setting, the setting the plurality of antennas in the selected narrow beam setting, and the transmitting a transmission using the plurality of antennas for remaining narrow beam settings in the sequence. The narrow beam setting is selected from a sequence of narrow beam settings.

In accordance with another embodiment, a method for operating a mobile station in a wireless communications system having a plurality of base stations is provided. The method includes measuring a channel quality indicator (CQI) from transmissions received at an antenna of the mobile station, selecting a time slot having a best CQI, transmitting information regarding the selected time slot to the base station, and monitoring the selected time slot for transmissions from the base station. Transmissions made by base stations in the wireless communications system are made synchronously and a sequence of antenna patterns used for transmission is known by the mobile station and the plurality of base stations.

In accordance with another embodiment, a communications system is provided. The communications system includes a baseband unit, a signal amplifier coupled to the baseband unit, a radio frequency circuit coupled to the signal amplifier by a high-power signal cable, and a control unit coupled to the plurality of switches and to the baseband unit. The baseband unit processes transmitted and received signals at a baseband frequency, and the signal amplifier amplifies a transmission signal produced by the baseband unit. The radio frequency circuit transmits an amplified transmission signal produced by the signal amplifier. The radio frequency circuit includes a passive network having a plurality of output ports and a plurality of input ports, each output port coupled to an antenna in a plurality of antennas, and a plurality of switches coupled to the high-power signal cable, each switch coupled to an input port in the plurality of input ports. The passive network provides a signal at an input port to an output port, and the plurality of switches selectively couples the amplified transmission signal conveyed by the high-power signal cable to the plurality of input ports based on a control signal. The control unit produces the control signal based on a specified coupling of the high-power signal cable to the plurality of antennas provided by the baseband unit. The radio frequency circuit and the control unit are located in close proximity with each other and far away from the baseband unit and the signal amplifier.

An advantage of an embodiment is that the performance improvements from beamforming may be achieved using one or a small number of antennas (along with a similarly small number of PAs and high-power signal cables). The small number of antennas may allow for the use of legacy communications towers with limited capability in the number of antennas that they are capable of supporting.

A further advantage of an embodiment is that the small number of antennas (as well as PAs and high-power signal cables) may significantly reduce the implementation costs of the wireless communications system in comparison to a comparable wireless communications system utilizing beamforming.

Yet another advantage of an embodiment is that existing hardware may be reused to further help reduce implementation costs.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a time division duplex (TDD) or frequency division duplex (FDD) wireless communications system that uses a single PA and a single high-power signal cable to connect to four transmit antennas by way of a switching fabric. The invention may also be applied, however, to other TDD or FDD wireless communications systems with different numbers of transmit antennas, such as two, six, eight, and so forth. Furthermore, the wireless communications systems may make use of multiple high-power signal cables and PAs.

Figure 1:
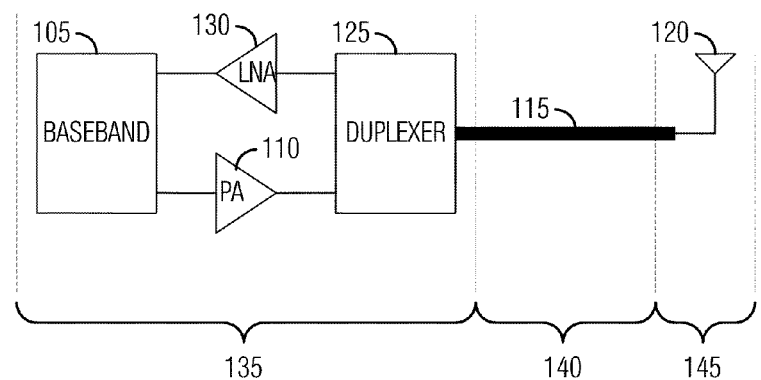
FIG. 1 is a diagram of a wireless communications system.

FIG. 1 is a diagram illustrating a high level view of a wireless communications system 100. Wireless communications system 100 includes a baseband unit 105 that may be used to provide baseband signal processing of signals to be transmitted or received signals. Signals to be transmitted may be provided to a PA 110 that may be used to amplify the signals to be transmitted to a power level required for transmission. The amplified signal produced by PA 110 may be provided to a high-power signal cable 115 and then to an antenna 120. High-power signal cable 115 may have considerable thickness (on the order of several inches in diameter to help minimize losses) and therefore, may have considerable weight. A duplexer (or radio frequency switch) 125 may enable a sharing of high-power signal cable 115 between the signal to be transmitted (output of PA 110) and the received signal (provided to a low noise amplifier (LNA) 130).

Wireless communications system 100 may be partitioned into three portions based on its relation with a communications tower. A first portion 135 may be located on the ground, for example, in an enclosure designed to protect delicate electronic equipment from the weather. First portion 135 may include baseband unit 105, PA 110, duplexer 125, and LNA 130. A second portion 140 may include high-power signal cable 115 and may run up the communications tower, and a third portion 145 may include antenna 120. Third portion 145 may be located at the top (or near the top) of the communications tower.

As shown in FIG. 1, wireless communications system 100 transmits and receives information using a single antenna (antenna 120). Should wireless communications system 100 be modified to use multiple transmit and/or receive antennas, each additional antenna may result in the addition of another antenna in third portion 145, another high-power signal cable in second portion 140, and another PA, LNA, and duplexer in first portion 135.

Since the weight loading and wind loading factors of the communications tower may allow the communications tower to support only a certain number of antennas and high-power signal cables, it may not be possible to add a required number of antennas and high-power signal cables to perform beamforming to a desired degree. A possible solution may be to erect a new communications tower that can support the required number of antennas and high-power signal cables. However, when considering a total number of communications towers that would be needed to provide good coverage all over an entirety of wireless communications system's coverage area, the cost of erecting new communications towers may be prohibitive. Furthermore, space and local zoning restrictions may prevent the installation of new communications towers. An additional restriction (or limitation) on the number of antennas may be the significant costs involved with the addition of each additional PA and high-power signal cable required for each additional antenna.

Beamswitching is an existing technology that may be an alternative to fully adaptive antenna arrays. Beamswitching offers much of the adaptive antenna gain available in beamforming without the complexity and costs typically associated with an adaptive antenna array. An environment that may be particularly suitable to beamswitching is that of interference limited small cells. Since beamswitching usually transmits onto a smaller beam space, it may achieve beamforming gain because mobile stations (MS) typically select a best beam that is most aligned with its channel and the base station (BS) reduces the interference to neighboring cells since it transmits in a smaller area compared to a BS that is not using a grid of beams (in which case, the BS that is not using a grid of beams would radiate transmit power over the entire cell).

Past implementations of wireless communications systems with beamswitching have used multiple high-power signal cables and PAs. As discussed above, the use of multiple high-power signal cables and PAs may increase implementation costs as well as prevent the use of existing communications towers with limited weight and wind loading factors.

Figure 2:
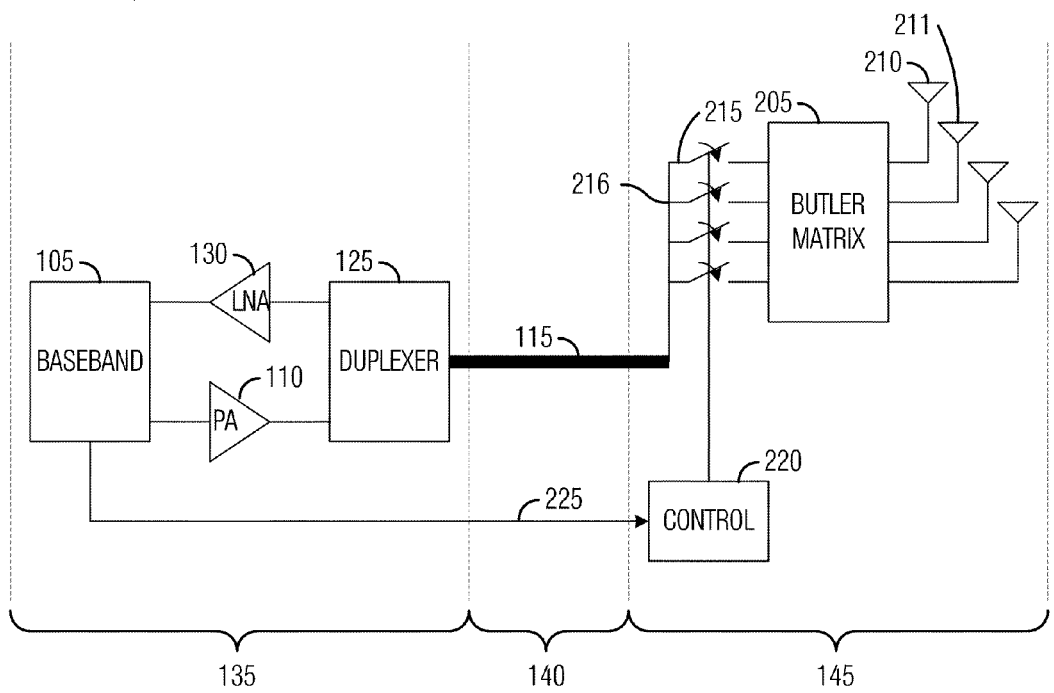
FIG. 2 is a diagram of a wireless communications system that makes use of beamswitching.
Figure 3:
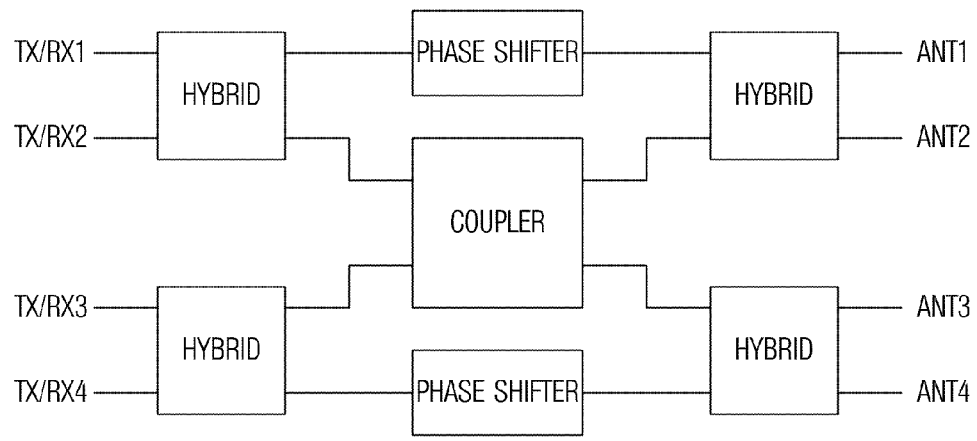
FIG. 3 is a diagram of a four-input, four-output Butler matrix.

FIG. 2 is a diagram illustrating a wireless communications system 200 that makes use of beamswitching. Wireless communications system 200 includes a passive network 205 having four (4) input ports and four (4) output ports and has the ability to get a signal at one of its input ports out to an output port. Passive network 205 as shown in FIG. 2 may commonly be referred to as a Butler matrix, and the two terms may be used interchangeably herein. FIG. 3 is a diagram illustrating a detailed view of Butler matrix 205 with four input ports (TX/RX1 through TX/RX4) and four output ports (ANT1 through ANT4).

Although shown as having four (4) input ports and four (4) output ports, Butler matrix 205 may have any number of input ports and output ports with numbers that are a power of two (2) being the most common, such as two, eight, 16, and so forth. Furthermore, the number of input ports does not necessarily need to be equal to the number of output ports. Therefore, the discussion of a Butler matrix with four (4) input ports and four (4) output ports should not be construed as being limiting to either the scope or the spirit of the embodiments.

Butler matrix 205 may be one of a variety of techniques that may be used to implement beamswitching. An alternative method to implement beamswitching is to use a number of directional antennas, with each directional antenna pointing in a different direction. Another alternative method to implement beamswitching is to use a weighting matrix to produce a set of directed antennas. Therefore, the discussion of Butler matrix 205 should not be construed as being limiting to either the scope or the spirit of the embodiments.

Turning back now to FIG. 2, the four (4) output ports of Butler matrix 205 may each be coupled to an antenna from a plurality of antennas, such as antenna 210 and antenna 211. Each of the antennas may have a different configuration so that it has a beam pattern different from other antennas in the plurality of antennas. The four (4) input ports of Butler matrix 205 may be coupled to one of a plurality of switches, such as switch 215 and switch 216. The plurality of switches may be controlled by a control signal provided by a control unit 220. Control unit 220 may be designed so that one of the switches in the plurality of switches may be closed at a given time. For example, switch 215 may be closed while the other switches in the plurality of switches may be open. Control unit 220 may also have a special mode wherein it may have all switches in the plurality of switches closed.

The plurality of switches may all be coupled to high-power signal cable 115 and may couple a signal to be transmitted (carried on high-power signal cable 115) to one of the input ports of Butler matrix 205 depending on the control signal provided by control unit 220. Butler matrix 205, the plurality of antennas, the plurality of switches, and control unit 220 may operate in combination to transmit the signal to be transmitted using one of the antennas in the plurality of antennas or all of the antennas in the plurality of antennas (when control unit 220 is in its special mode). When the signal to be transmitted is transmitted using only a single antenna, it will be transmitted having a shaped beam per the antenna used in the transmission. When the signal to be transmitted is transmitted using all of the antennas in the plurality of antennas, then the signal will be transmitted as if it is transmitted by an omni-directional antenna. Signals received at the plurality of antennas may pass back through Butler matrix 205, the plurality of switches, high-power signal cable 115, duplexer 125, and LNA 130 to baseband unit 105.

Butler matrix 205, the plurality of switches, and the plurality of antennas may be located in close proximity to one another when compared with the relative positions of baseband unit 105, LNA 130, PA 110, duplexer 125. Butler matrix 205, the plurality of switches, and the plurality of antennas may be located within a few feet or meters of each other, while baseband unit 105, LNA 130, PA 110, duplexer 125 may be located far away (20, 30, or 40 feet or more) from Butler matrix 205, the plurality of switches, and the plurality of antennas.

Figure 4A:
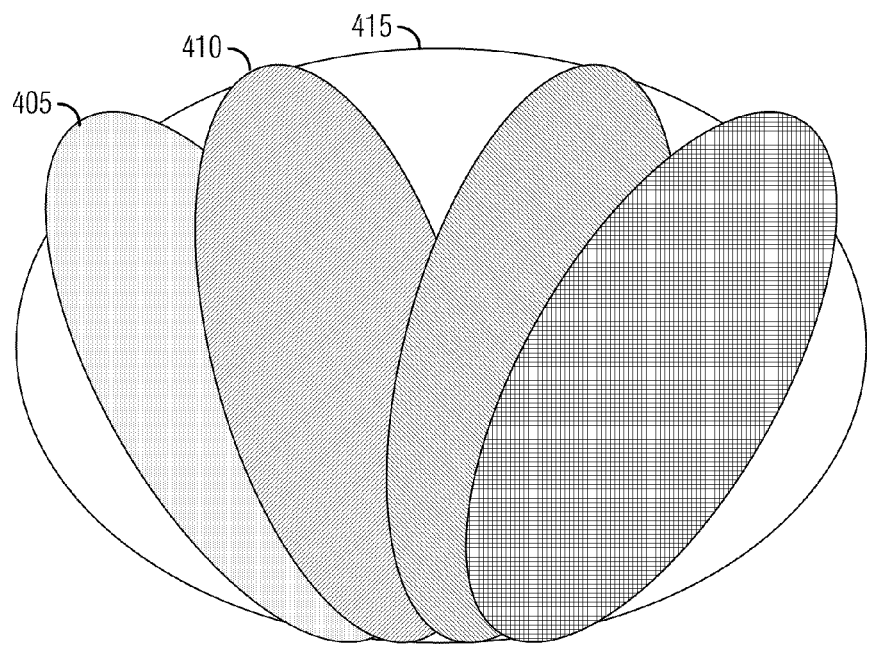
FIG. 4a is a diagram of possible antenna beams from a plurality of antennas.
Figure 4B:
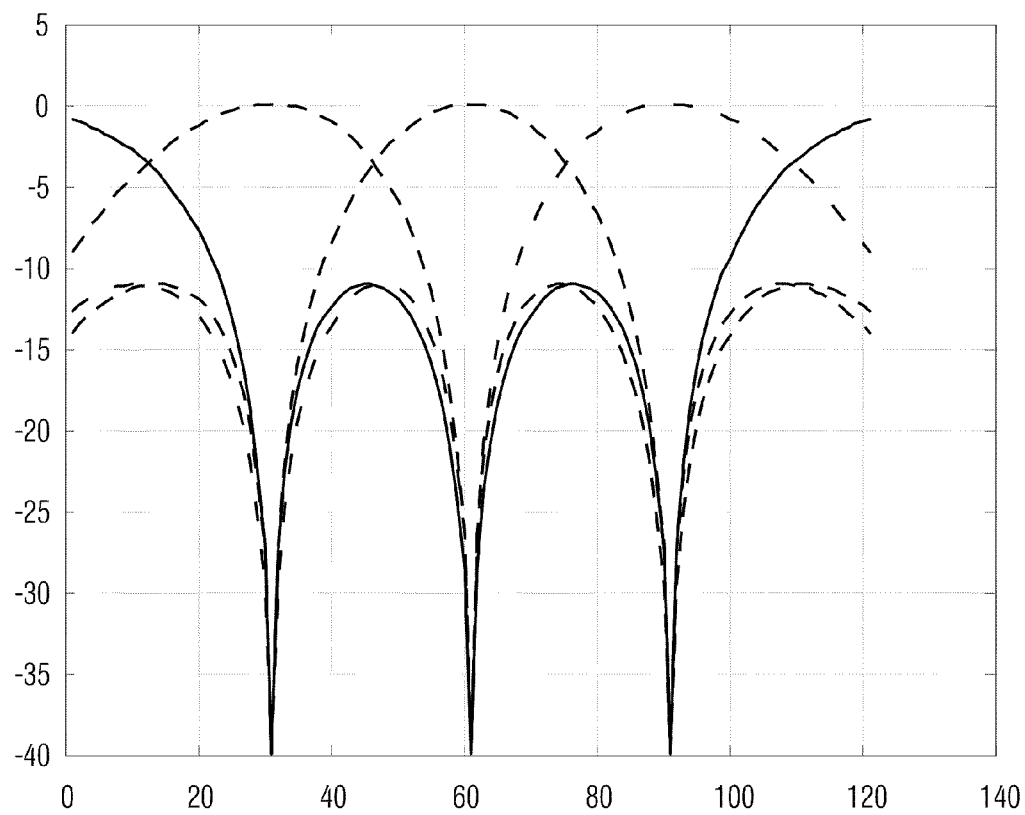
FIG. 4b is a data plot of possible antenna beam patterns from a plurality of antennas with omni-directional antenna elements.

FIG. 4a is a diagram illustrating possible antenna beams from the plurality of antennas. As shown in FIG. 4a, there are four directional antenna beams, such as directional antenna beam 405 and directional antenna beam 410, corresponding to antenna 210 and antenna 211, respectively. FIG. 4a also illustrates an omni-directional beam 415 that may correspond to the use of all antennas in the plurality of antennas to transmit the signal to be transmitted. FIG. 4b is a diagram illustrating possible antenna beam patterns from the plurality of antennas, wherein the antennas in the plurality of antennas have omni-directional elements.

Figure 4C:
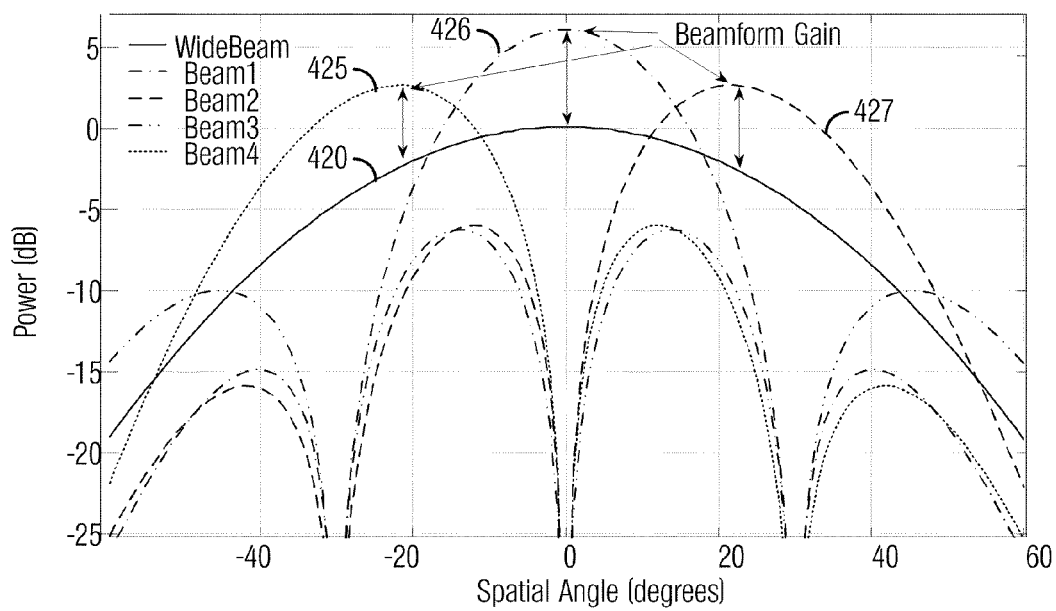
FIG. 4c is a data plot of possible antenna beam patterns from a plurality of antennas with 70 degree directional antenna elements.
Figure 4D:
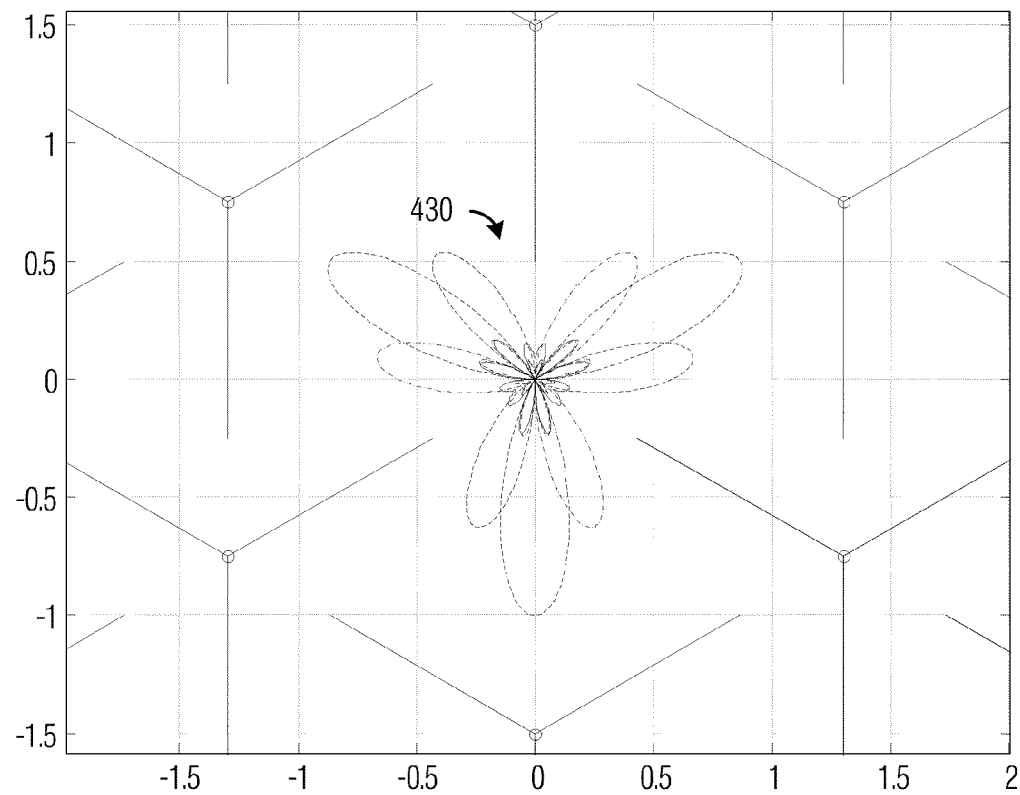
FIG. 4d is a diagram of a typical three-sector cellular communications system.

FIG. 4c is a diagram illustrating possible antenna beam patterns from the plurality of antennas, wherein the antennas in the plurality of antennas have 70 degree directional elements. Again, widebeam (shown as trace 420) may be achieved with all of the antennas in the plurality of antennas being used to transmit the signal to be transmitted. Some of the antennas have main lobes (such as lobes 425, 426, and 427) that are larger than widebeam (trace 420), thereby achieving beamforming gain. FIG. 4d is a diagram illustrating a typical three-sector cellular communications system layout with directional beam patterns of a center cell 430.

Turning back to FIG. 2, wireless communications system 200 also includes baseband unit 105, PA 110, duplexer 125, and LNA 130 to perform signal processing functions typical in a communications system. In addition to high-power signal cable 115, wireless communications system 200 also includes a control unit signal line 225 coupling baseband unit 105 to control unit 220. Control unit signal line 225 may be used by baseband unit 105 to control the selection of the switches in the plurality of switches, and therefore, the shaped beam being used to transmit the signal to be transmitted.

As shown in FIG. 2, the inclusion of beamswitching, which may yield beamforming-like performance improvements, in wireless communications system 200 requires the addition of circuitry located mostly in third portion 145. Since third portion 145 is located at the top or near the top of a communications tower, existing communications towers may be capable of supporting the additional circuitry. This may especially be true since Butler matrix 205 may be a passive device so it may be physically small and control unit 220 and the plurality of switches may also be physically small. Control unit signal line 225 may be a low voltage signal line, so a very small wire may be capable of connecting baseband unit 105 to control unit 220. No additional high-power signal cables may be required since the switching of the signal to be transmitted is performed at the top of the communications tower immediately before the signal is to be transmitted. Therefore, beamswitching may be added to existing wireless communications systems without requiring the use of new communications towers.

Figure 5A:
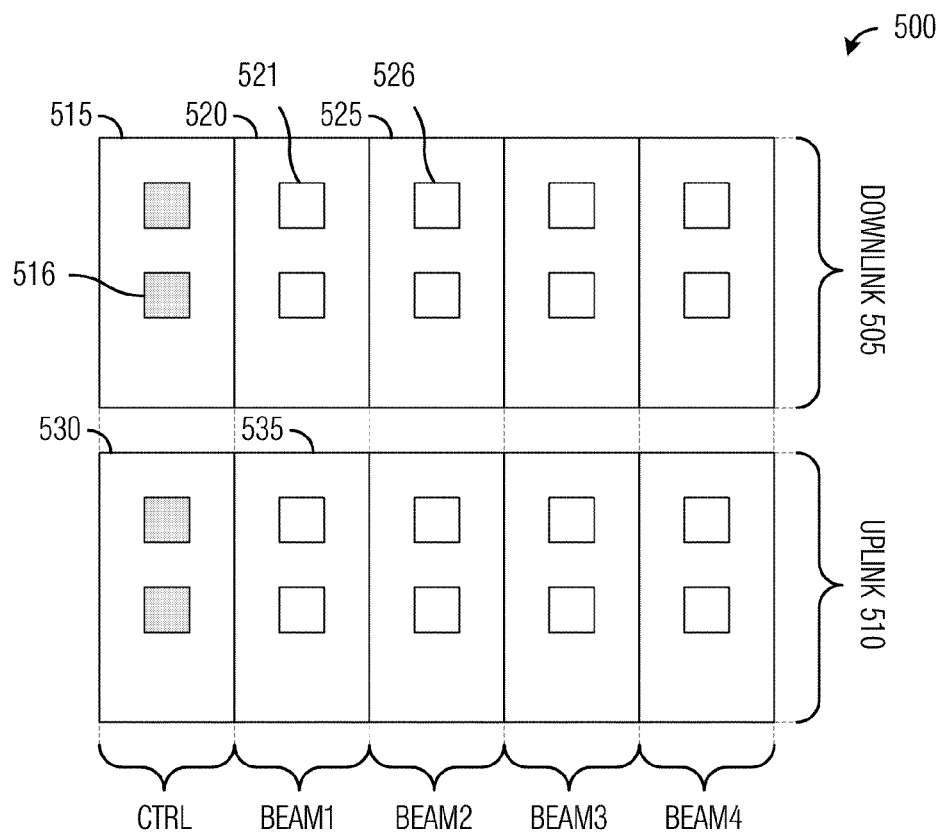
FIG. 5a is a diagram of a frame structure of a frequency division duplex (FDD) wireless communications system.

FIG. 5a is a diagram illustrating a frame structure 500 of a FDD wireless communications system using beamswitching. Frame structure 500 includes a downlink (DL) portion 505 transmitted in a first frequency range and an uplink (UL) portion 510 transmitted in a second frequency range. DL portion 505 and UL portion 510 may occur at substantially the same time since the first frequency range and the second frequency range do not overlap.

DL portion 505 includes a control (CTRL) slot 515 that may be transmitted in a widebeam mode. CTRL slot 515 may include one or more pilots (such as pilot 516). Pilots may be used by MS to identify, synchronize, train, measure channel quality indication (CQI), and so forth. CTRL slot 515 may be used by BS to transmit control information to the MS, such as uplink transmission resource assignments, and so forth. CTRL slot 515 may be transmitted using a widebeam mode, i.e., using all of the antennas in the plurality of antennas. DL portion 505 also includes a slot for transmissions by each antenna in the plurality of antennas. The slots used for transmissions other than control information may be referred to as non-control slots. Each slot may be used by a different antenna to transmit using different beams. For example, a first antenna may transmit using a first beam in slot 520, a second antenna may transmit using a second beam in slot 525, and so forth. Each slot includes one or more pilots, such as pilot 521 in slot 520 and pilot 526 in slot 525. Pilots in each slot may be used by MS to identify, synchronize, train, measure CQI, and so forth. Each slot may have the same number of pilots or the number of pilots in CTRL slot 515 may be different from the number of slots in non-control slots. Similarly, UL portion 510 may have a CTRL slot 530 and non-control slots, such as slot 535.

Although shown FIG. 5a as being cycled through in order, an ordering of antennas in the plurality of antennas may be in any particular order or no order at all. For example, with four antennas in the plurality of antennas, exemplary orderings for the plurality of antennas may be 1234 (as shown in FIG. 5a), 2341, 3412, 4321, 4231, 1324, 1423, 2314, 2341, and so forth. In general, any ordering may be used as long as BS and MS know the ordering used. Additionally, the ordering used may be repeated for each cycle, for example, 1234, 1234, 1234, and so forth. In an alternative embodiment, different orderings may be used in each cycle through the plurality of antennas. Again, as long as both BS and MS know the ordering used, practically any ordering may be used.

Although any ordering may be used to cycle through the antennas, in the FDD wireless communications system, both DL portion 505 and UL portion 510 should simultaneously use the same antenna (or all antennas). For example, CTRL slot 515 and CTRL slot 530 occur at about the same time, and slot 520 and slot 535 both use the first antenna at about the same time.

Figure 5B:
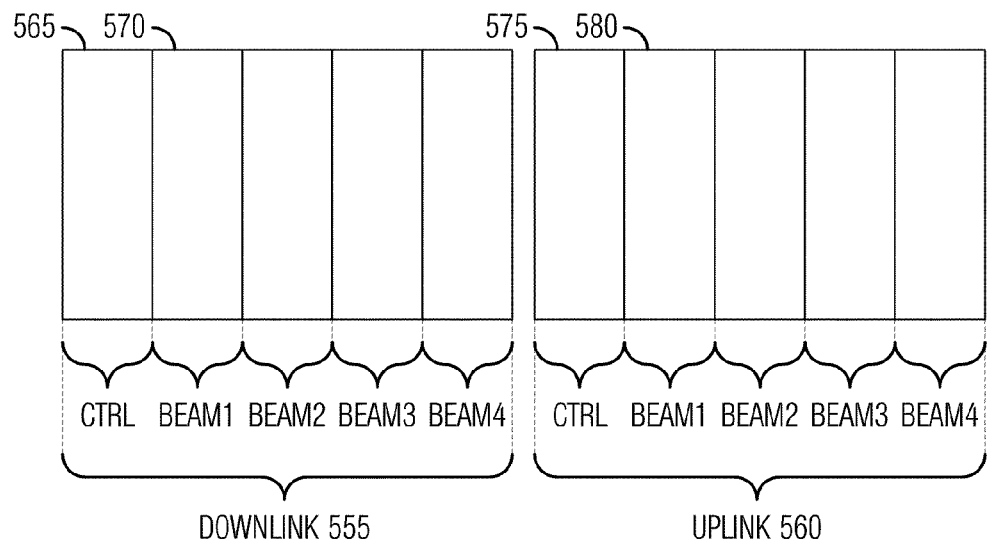
FIG. 5b is a diagram of a frame structure of a time division duplex (TDD) wireless communications system.

FIG. 5b is a diagram illustrating a frame structure 550 of a TDD wireless communications system using beamswitching. Frame structure 550 includes a DL portion 555 and a UL portion 560. Both DL portion 555 and UL portion 560 may be transmitted within a single frequency range, but at different times so that they do not overlap.

DL portion 555 includes a CTRL slot 565 that may be transmitted in a widebeam mode. CTRL slot 565 may or may not contain pilots, because although MS may need to calculate CQI on a per slot basis, it needs to only indicate a best CQI over multiple slots or single frame. Since the BS knows which beam was used for any reported CQI, it may be able to determine which beam to use for a particular MS. Therefore, CQI reporting overhead in a TDD wireless communications system may be low. DL portion 555 also includes a slot for transmissions by each antenna in the plurality of antennas, such as slot 570 for a first antenna transmitting using a first beam. Again, slots may not need to contain pilots.

UL portion 560 includes a CTRL slot 575 that may be transmitted in a widebeam mode. CTRL slot 575 may not contain pilots. UL portion 560 also includes a slot for transmissions by each antenna in the plurality of antennas, such as slot 580 for a first antenna transmitting using a first beam. Again, slots may not need to contain pilots.

Figure 6:
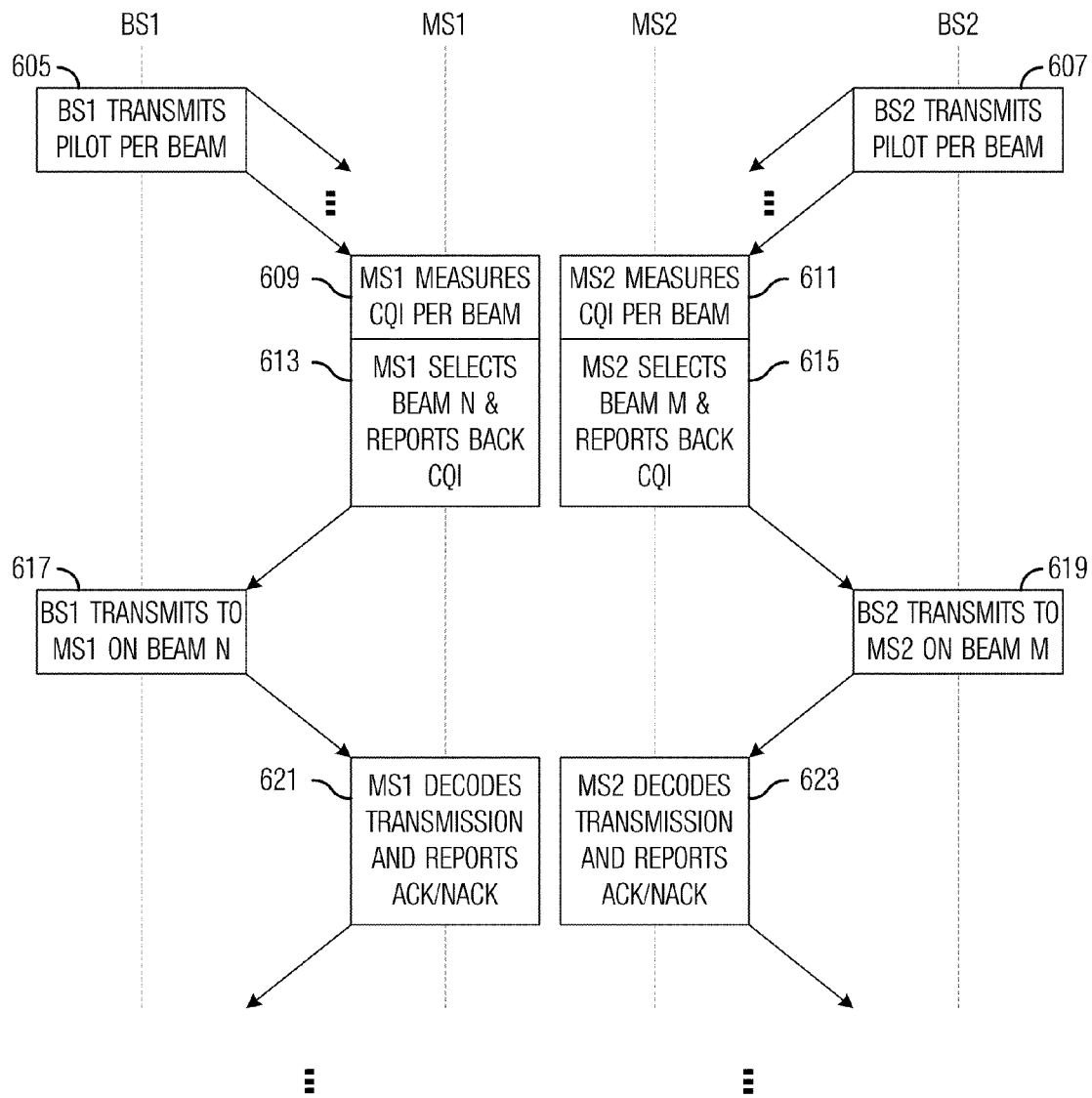
FIG. 6 is a diagram of transmissions made by BS and MS operating in a FDD wireless communications system.

FIG. 6 is a diagram illustrating transmissions made by BS and MS operating in a FDD wireless communications system using beamswitching. Communications from two adjacent cells, a first cell served by a first BS "BS1" and a second cell served by a second BS "BS2," are shown. Communicating with BS1 is a first MS "MS1," while a second MS "MS2" is communicating with BS2. In order to maximize performance gains from beamswitching, the BS and the MS communicate in synchrony.

Both BS1 and BS2 transmit pilots, among with any other control information that they may have to transmit, using widebeam mode (all of the antennas in the plurality of antennas) for a CTRL slot and narrow beam mode (individual antennas in the plurality of antennas) for each non-control slot (blocks 605 and 607). As BS1 and BS2 transmit the CTRL slot and non-control slots, MS1 and MS2 measure CQI for each slot (both CTRL slot and non-control slots) using the pilots transmitted by BS1 and BS2 (blocks 609 and 611). MS1 may then select a slot that yielded its best CQI and transmits the information back to BS1 (block 613), while MS2 may select a slot that yielded its best CQI and transmits the information back to BS2 (block 615). The slots yielding the best CQI for MS1 and MS2 may not need to be the same slot since the position of a MS in the cell will play a large role in the selection of the slot yielding the best CQI. From the selected slot, a corresponding antenna may be determined by the respective BS.

Because the antenna used to make transmissions is known by both BS and MS, the identity of the antenna may readily be determined. If BS1 (or BS2) has any information to transmit to MS1 (or MS2), BS1 (BS2) may transmit to MS1 (MS2) using the slot and beam or antenna selected by MS1 (MS2) (blocks 617 and 619) and MS1 (MS2) may receive and decode the transmission and reports back an acknowledgment (ACK) or negative acknowledgment (NACK) as needed (block 621 and 623).

Both the synchronous transmissions and the known ordering of the use of the beams or antennas in the plurality of beams and antennas may help to improve the performance of beamswitching. The synchronous transmissions and the known ordering help to improve the accuracy of the CQI measurements made by the MS operating in the wireless communications systems because if a transmission is occurring while a MS is making its CQI measurement of a slot, then during a subsequent slot when the MS may be making a transmission, another MS (the one that was transmitting while the MS was making its CQI measurement) will likely be making a transmission as well. This may produce a consistent channel quality conducive to performance.

The use of the CQI report from a MS to determine the slot (and beam or antenna) to use to transmit to the MS may require that for optimum performance, the MS may not be in rapid motion. As long as the MS does not move so quickly that the slot (and beam or antenna) selected by the MS as yielding the best CQI is no longer valid before the transmission may be made, the use of CQI to determine the slot will result in optimum performance. A technique that may be used to relax restrictions on the mobility of a MS may be to increase the frequency of the CQI reporting and slot selection. As the frequency of CQI reporting and slot selection increases, the velocity of the MS may move while remaining within a beam of an antenna transmitting during the selected slot may also increase.

The above discussion focuses on a FDD wireless communications system that transmits pilots during its slots. Although a TDD wireless communications system may not necessarily transmit pilots (as shown in FIG. 5b), a MS may still be able to measure CQI of individual slots by measuring the channel during the slot. The MS may also average CQI for the slot over several frames. However, the MS needs to average only over slots using similar beams.

Figure 7:
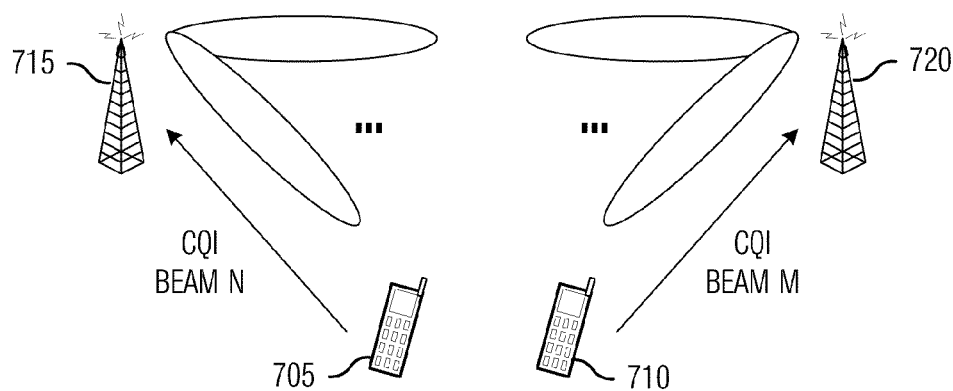
FIG. 7 is a diagram of two MS operating in two adjacent cells of a wireless communications system.

FIG. 7 is a diagram illustrating the operation of two MS in two adjacent cells. FIG. 7 graphically illustrates the signal flow described in FIG. 6. A first MS "MS1" 705 may measure transmissions from a first BS "BS1" 715 and a second MS "MS2" 710 may measure transmissions from a second BS "BS2" 720 to determine the best CQI, which it may report back to its respective BS. Then, transmissions to the MS may be made using the slot corresponding to the best CQI.

Figure 8A:
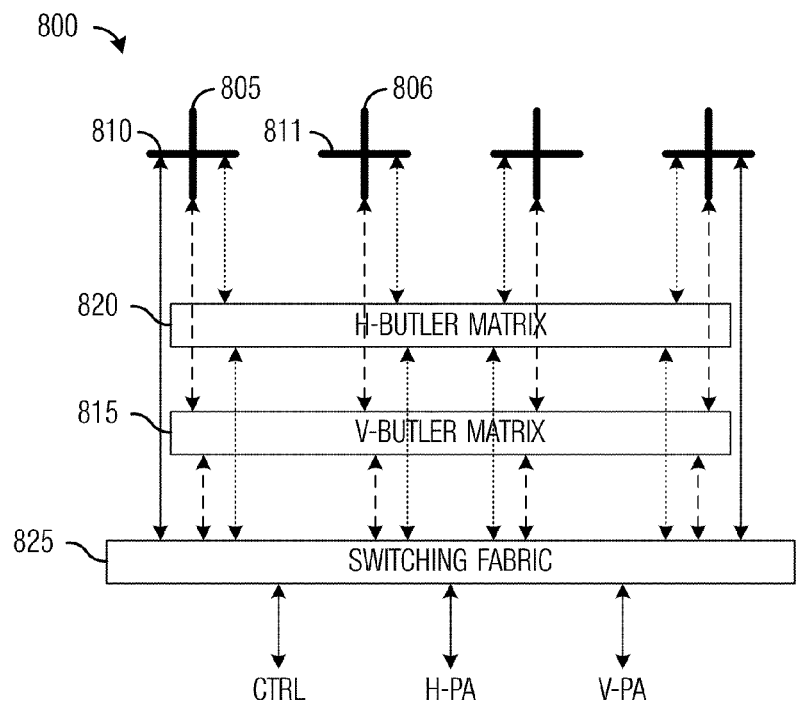
FIG. 8a is a diagram of a portion of a wireless communications system using beamswitching with cross-polarized antennas.

The embodiments discussed above make use of antennas with omni-directional elements or directional elements. It may also be possible to use polarized antennas, such as X-polarized antennas or cross-polarized antennas, and a number of Butler matrices to implement beamswitching. FIG. 8a is a diagram illustrating a portion of a wireless communications system 800 with beamswitching implemented using cross-polarized antennas. The portion of wireless communications system 800 shown in FIG. 8a may be located in third portion 145, located at the top or near the top of a communications tower.

Wireless communications system 800 includes four (4) antenna elements that are vertically (V) polarized, such as antennas 805 and 806, and four (4) antenna elements that are horizontally (H) polarized, such as antennas 810 and 811. The V-polarized antenna elements may be coupled to output ports of a Butler matrix used with the vertically polarized antenna elements, also referred to as V-Butler matrix 815. Similarly, the H-polarized antenna elements may be coupled to output ports of a Butler matrix used with the horizontally polarized antenna elements, also referred to as H-Butler matrix 820. In place of cross-polarized antenna elements, X-polarized antenna elements may be used. In such an implementation, instead of making vertical and/or horizontal polarization adjustments, +45 degree and/or −45 degree polarization adjustments may be made.

The V-polarized antenna elements and the H-polarized antenna elements may be fed by a single transmitted signal or by separate transmitted signals. If fed by a single transmitted signal, the V-polarized antenna elements and the H-polarized antenna elements may not be used simultaneously, while if fed by separate transmitted signals, the V-polarized antenna elements and the H-polarized antenna elements may be used simultaneously. As shown in FIG. 8a, separate transmitted signals may be provided, with a first transmitted signal from a first PA "V-PA" and a second transmitted signal from a second PA "H-PA."

A switching fabric 825 may couple a control signal line to either or both Butler matrices. Switching fabric 825 may also couple the separate transmitted signals to corresponding Butler matrices. For example, switching fabric 825 may configure switches to input ports of V-Butler matrix 815 based on a value on the control signal line at the same time it is coupling the transmitted signal from V-PA to V-Butler matrix 815. Switching fabric 825 may also configure switches to input ports of H-Butler matrix 820 based on a potentially different value on the control signal line at the same time that it is coupled the transmitted signal from H-PA to H-Butler matrix 820.

Although shown in FIG. 8a as having two separate transmitted signals from two PAs, wireless communications system 800 may also function with one transmitted signal from one PA. In such a situation, switching fabric 825 may configure switches to input ports of either V-Butler matrix 815 or H-Butler matrix 820 based on a value on control signal line at the same time that it is coupling the transmitted signal from the PA to the input ports of the Butler matrix. Then, to make use of the alternate Butler matrix, at a next slot, switching fabric 825 may configure switches to input ports of the alternate Butler matrix while coupling the transmitted signal to the alternate Butler matrix. Therefore, the discussion of two separate transmitted signals from two PAs should not be construed as being limiting to either the scope or the spirit of the embodiments.

With the configuration shown in FIG. 8a, wireless communications system 800 may be capable of transmitting using four different V-polarized narrow beams, four different H-polarized narrow beams, four different V-polarized and H-polarized narrow beams for spatial multiplexing or space time coded transmit diversity (this requires the use of two separate transmitted signals from two PAs), a V-polarized widebeam, a H-polarized widebeam, as well as dynamically switching between any of the listed beams. For example, if a cell contains two groups of users: a first group of high-speed users and a second group of low-speed users, the first group may benefit from widebeam transmissions with diversity gain, while the second group may benefit from narrow beam selection with scheduling gain.

The use of dual polarizations in wireless communications system 800 may allow for the use of two radio frequency (RF) chains and may make use of two pilots (one pilot per RF chain). Wireless communications system 800 also allows spatial multiplexing with beamswitching, with V-polarization and H-polarization beams switching synchronously per frame. A MS may see two different virtual antennas for BS. The MS may perform rank selection on a best frame as well as CQI reporting per virtual antenna after it performs rank selection. Wireless communications system 800 also provides transmit diversity with widebeam transmission, with space frequency block coding (SFBC) applied on widebeam transmissions.

Figure 8B:
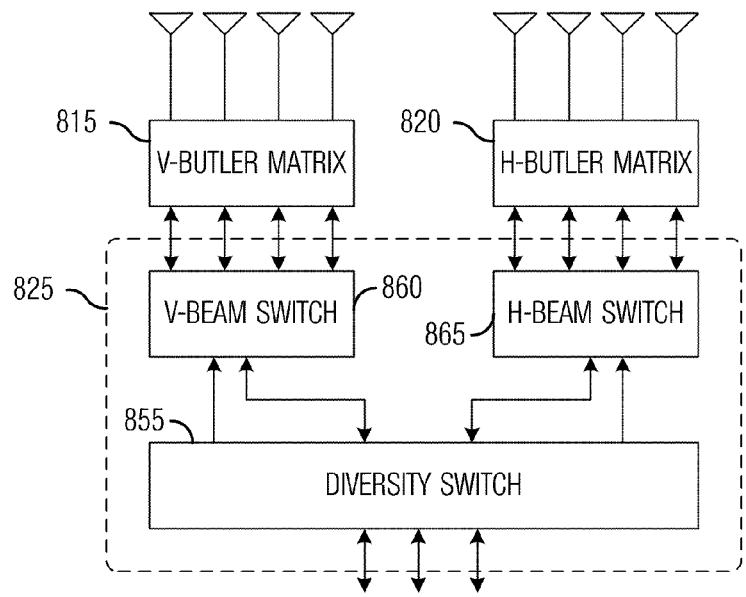
FIG. 8b is a diagram of a portion of a wireless communications system using beamswitching with cross-polarized antennas, with emphasis placed on a switching fabric.

FIG. 8b is a diagram illustrating a detailed view of a portion of wireless communications system 800. FIG. 8b illustrates a detailed view of switching fabric 825, along with V-Butler matrix 815, H-Butler matrix 820, and antennas. Switching fabric 825 includes a diversity switch 855 that may switch between either a V-beam switch 860 or an H-beam switch 865. Diversity switch 855 may couple V-beam switch 860 or H-beam switch 865 to the transmitted signals. If there is one transmitted signal, then the transmitted signal may be coupled to either V-beam switch 860 or H-beam switch 865, while if there are two transmitted signals, then diversity switch 855 may coupled one transmitted signal to V-beam switch 860 and another transmitted signal to H-beam switch 865.

V-beam switch 860 and H-beam switch 865 may each include a plurality of switches that may couple the transmitted signal to input ports of V-Butler matrix 815 or H-Butler matrix 820, respectively. V-beam switch 860 and H-beam switch 865 may operate like the plurality of switches discussed previously and may be configured by a control signal on a control signal line from control unit 220, the routing of which may also be controlled by diversity switch 855.

Figure 9A:
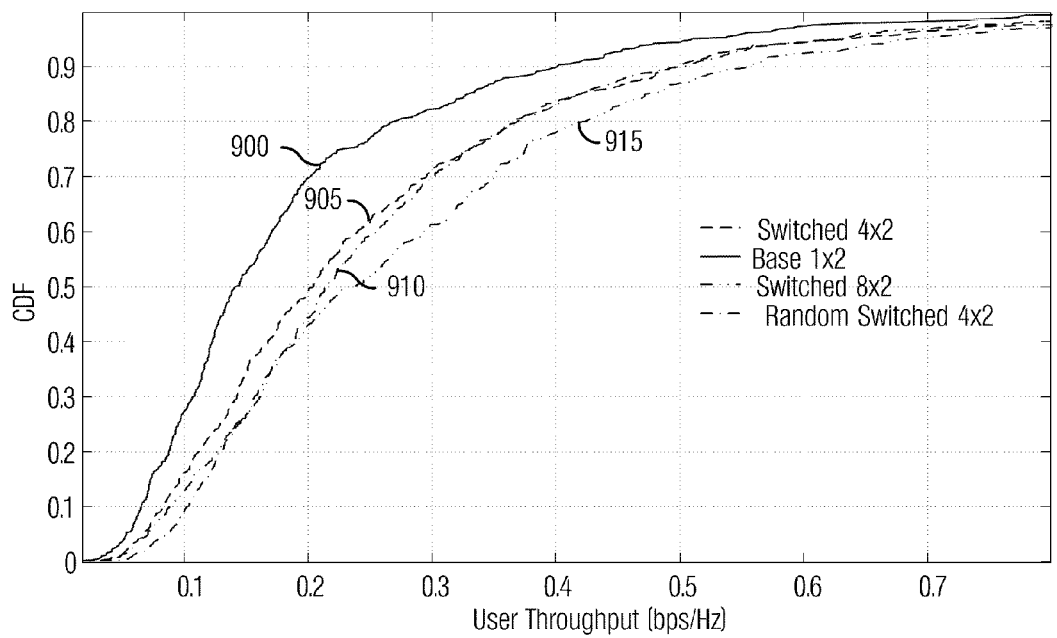
FIG. 9a is a data plot of cumulative distribution function of user throughput.
Figure 9B:
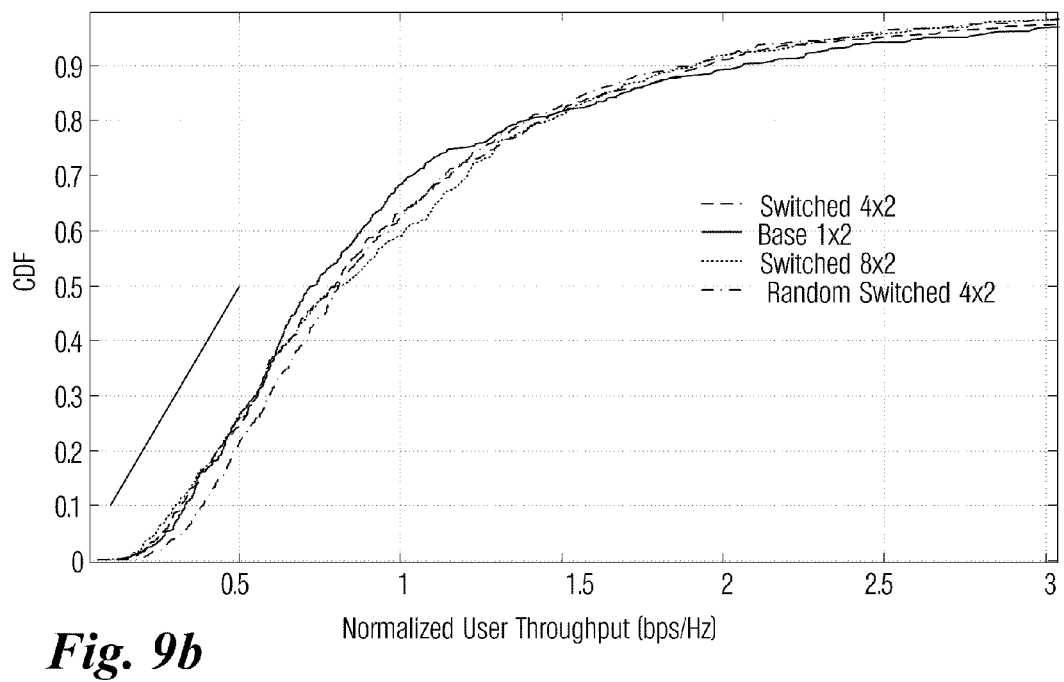
FIG. 9b is a data plot of a fairness curve.

FIGS. 9a and 9b are data plots of simulation results of wireless communications systems. FIG. 9a illustrates a cumulative distribution function (CDF) of user throughput and FIG. 9b illustrates a fairness curve for the same wireless communications systems. As shown in FIG. 9a, a first trace 900 represents the CDF of user throughput for a baseline one-transmit, two-receive (1×, 2×) antenna wireless communications system, a second trace 905 represent the CDF of user throughput for a beamswitching four-transmit, two-receive (4×, 2×) antenna wireless communications system using cyclic narrow beam switching, a third trace 915 represent the CDF of user throughput for a beamswitching eight-transmit, two-receive (8×, 2×) antenna wireless communications system using cyclic narrow beam switching, and a fourth trace 910 represent the CDF of user throughput for a beamswitching four-transmit, two-receive (4×, 2×) antenna wireless communications system using random narrow beam switching. The beamswitching wireless communications systems exhibit superior user throughput with the beamswitching wireless communications systems with more transmit antennas performing better than ones with fewer transmit antennas. FIG. 9b illustrates that fairness in the various wireless communications systems are about equal, with all traces clumping together.

Figure 10A:
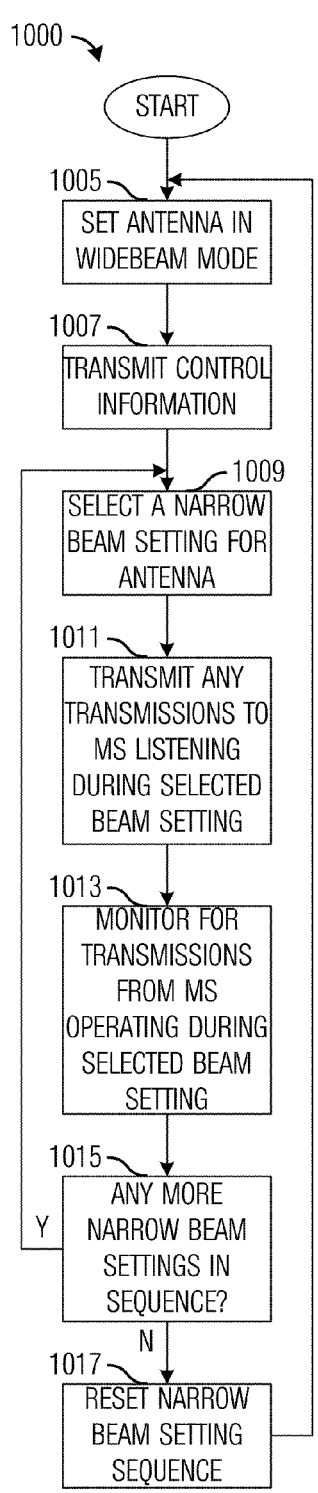
FIG. 10a is a flow diagram of BS operation in a FDD wireless communications system.

FIG. 10a is a flow diagram of BS operation 1000, wherein the BS is operating in a FDD wireless communications system. BS operation 1000 as described herein may take place continuously while a BS is in a normal operating mode of communicating with MS operating within its cell. The operation may begin when the BS is powered on and after it completes any necessary configuration and training operations. The operation may continue as long as the BS remains powered on and is not placed in a special operating mode or the like.

BS operation 1000 may begin with the BS setting it's transmit antennas in a widebeam mode prior to (or immediately at the beginning of) a control slot is to be transmitted by the BS (block 1005). Setting the transmit antennas in widebeam mode may be accomplished by providing a control signal to the plurality of switches at input ports of a Butler matrix to set the plurality of switches into a closed mode, thereby connecting a signal to be transmitted to each transmit antenna, for example. With the transmit antennas set in the widebeam mode, the BS may transmit control information in the control slot (block 1007). The control information may or may not contain pilots that may be used by MS to measure CQI, for example.

At the end of the control slot (or immediately at the beginning of a narrow beam slot), the BS may select one of a plurality of narrow beam settings for it's transmit antennas and use the selected narrow beam setting to configure its transmit antennas (block 1009). The selection of the narrow beam setting may be specified in a sequence known by both the BS and MS. The selected narrow beam setting may correspond to the narrow beam slot that has just started or is immediately following the end of the control slot. The sequence may be in simple numerical order or a more complex ordering or a random or pseudo-random sequence. For example, if there are four narrow beam settings numbered 1 through 4, the sequence may simply be narrow beam setting 1 followed by narrow beam settings 2 through 4. As with the widebeam setting, the BS may configure its transmit antennas by providing a control signal corresponding to the selected narrow beam setting to the plurality of switches at input ports of the Butler matrix to set the states of the switches in the plurality of switches.

Once the transmit antennas are configured per the selected narrow beam setting, the BS may transmit transmissions to MS known to be listening during the narrow beam slot and expecting the selected narrow beam setting over a DL frequency range (block 1011). Also occurring as the BS is transmitting transmissions, the BS may also be monitoring an UL frequency range for transmissions made by MS (block 1013). The transmissions made by the MS may be reserved for MS that are known to also be listening for transmissions made by the BS over the DL frequency range.

As the narrow beam slot ends or as another narrow beam slot begins, the BS may check to determine if there are anymore narrow beam settings in the sequence of narrow beam settings (block 1015). If there are more narrow beam settings in the sequence, the BS may select the next narrow beam setting in the sequence and repeat the transmitting (block 1011) and monitoring (block 1013). If there are no more narrow beam settings in the sequence, i.e., the BS has selected all narrow beam settings in the sequence, then the BS may reset the sequence (block 1017) and repeat the setting the widebeam mode and transmitting control information (blocks 1005 and 1007) and the selecting the narrow beam settings from the sequence and transmitting and receiving (blocks 1009 through 1013).

Figure 10B:
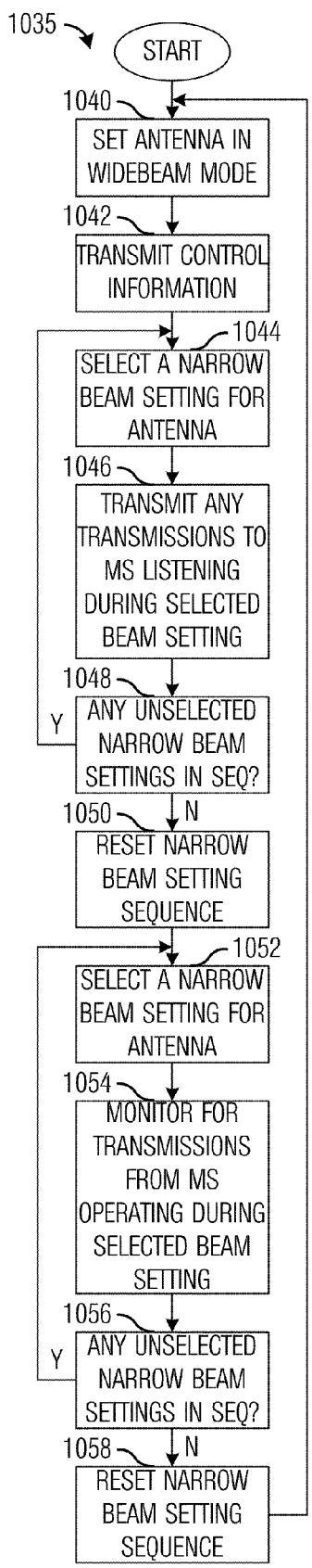
FIG. 10b is a flow diagram of BS operation in a TDD wireless communications system.

FIG. 10b is a flow diagram of BS operation 1035, wherein the BS is operating in a TDD wireless communications system. BS operation 1035 as described herein may take place continuously while a BS is in a normal operating mode of communicating with MS operating within its cell. The operation may begin when the BS is powered on and after it completes any necessary configuration and training operations. The operation may continue as long as the BS remains powered on and is not placed in a special operating mode or the like.

BS operation 1035 may begin with the BS setting its transmit antennas in a widebeam mode prior to (or immediately at the beginning of) a control slot being transmitted by the BS (block 1040). Setting the transmit antennas in widebeam mode may be accomplished by providing a control signal to the plurality of switches at input ports of a Butler matrix to set the plurality of switches into a closed mode, thereby connecting a signal to be transmitted to each transmit antenna. With the transmit antennas set in the widebeam mode, the BS may transmit control information in the control slot (block 1042). The control information may or may not contain pilots that may be used by MS to measure CQI, for example.

At the end of the control slot (or immediately at the beginning of a narrow beam slot), the BS may select one of a plurality of narrow beam settings for it's transmit antennas and use the selected narrow beam setting to configure its transmit antennas (block 1044). The selection of the narrow beam setting may be specified in a sequence known by both the BS and MS. The selected narrow beam setting may correspond to the narrow beam slot that has just started or is immediately following the end of the control slot. The sequence may be in simple numerical order or a more complex ordering or a random or pseudo-random sequence. For example, if there are four narrow beam settings numbered 1 through 4, the sequence may simply be narrow beam setting 1 followed by narrow beam settings 2 through 4. As with the widebeam setting, the BS may configure its transmit antennas by providing a control signal corresponding to the selected narrow beam setting to the plurality of switches at input ports of the Butler matrix to set the states of the switches in the plurality of switches.

Once the transmit antennas are configured per the selected narrow beam setting, the BS may transmit transmissions to MS known to be listening during the narrow beam slot and expecting the selected narrow beam setting over a DL frequency range (block 1046). As the narrow beam slot ends or as another narrow beam slot begins, the BS may check to determine if there are anymore narrow beam settings in the sequence of narrow beam settings (block 1048). If there are additional narrow beam settings in the sequence, the BS may select the next narrow beam setting in the sequence and repeat the transmitting (block 1046). If there are no more narrow beam settings in the sequence, i.e., the BS has selected all narrow beam settings in the sequence, then the BS may reset the sequence (block 1050) and then select a narrow beam setting from the sequence (block 1052). After selecting the narrow beam setting, the BS may configure its transmit antennas per the selected narrow beam setting and monitor during a corresponding narrow beam slot for transmissions from MS that are known to be listening for transmissions made by the BS using the same narrow beam setting (block 1054). The sequence of narrow beam settings used for BS transmissions and BS monitoring may or may not be identical.

As the narrow beam slot ends or as another narrow beam slot begins, the BS may check to determine if there are anymore narrow beam settings in the sequence of narrow beam settings (block 1056). If there are more narrow beam settings in the sequence, the BS may select the next narrow beam setting in the sequence (block 1052) and repeat the monitoring (block 1054). If there are no more narrow beam settings in the sequence, i.e., the BS has selected all narrow beam settings in the sequence, then the BS may reset the sequence (block 1058) and repeat the setting the widebeam mode and transmitting control information (blocks 1040 and 1042) and transmitting transmissions to MS over narrow beam settings (blocks 1044 through 1048) and monitoring transmissions from MS over narrow beam settings (blocks 1052 through 1056).

Figure 10C:
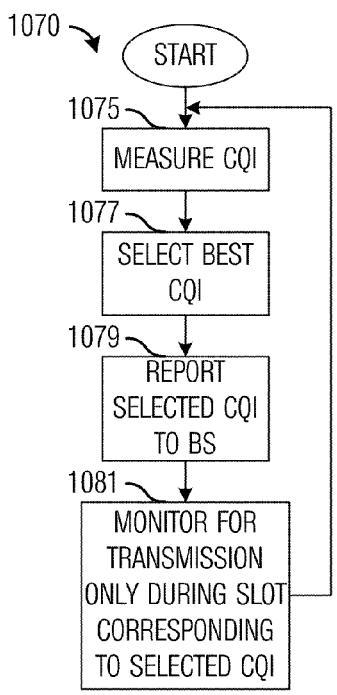
FIG. 10c is a flow diagram of MS operation.

FIG. 10c is a flow diagram of MS operation 1070. MS operation 1070 as described herein may take place continuously while a MS is in normal operating mode of communicating with a BS. The operating may begin when the MS is powered on and after it completes any necessary configuration and training operations. The operation may continue as long as the MS remains powered on and is not placed in a special operating mode or the like.

MS operation 1070 may begin with the MS measuring CQI (block 1075). The MS may measure CQI by using the pilots transmitted by the BS in frames and/or slots. The MS may average the measured over several frames and/or slots. If the BS does not transmit pilots, the MS may still measure a frame's or a slot's CQI by measuring other transmissions made in the frame or slots over several frames or slots.

The MS may then select the slot that has the best CQI (block 1077). The selection of the best CQI may be as simple as selecting the highest measured CQI. If there are several measured CQI that are about equal, then the MS may select a CQI if the corresponding slot has lowest utilization, for example. The MS may also select a CQI by maintaining a history of measured CQI and selecting a slot with the highest CQI over time, for example. After selecting the best CQI, the MS may report the selected CQI to the BS (block 1079). Since the selected CQI corresponds to a slot, the MS may begin to monitor the slot corresponding to the selected CQI for transmissions from the BS (block 1081). The MS may periodically repeat the measuring of the CQI and the selecting of the best CQI to help ensure that good performance is maintained. This may be especially important if the MS is in motion. Typically, the faster the MS is in motion, the more often the MS may need to repeat the CQI selection.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communications system comprising:
   a high-power signal cable coupled to a signal amplifier, the high-power signal cable to convey a transmission signal produced by the signal amplifier;
   a radio frequency circuit coupled to the high-power signal cable, the radio frequency circuit configured to transmit and receive signals, the radio frequency circuit comprising:

a plurality of antennas, a passive network having a plurality of output ports and a plurality of input ports, each output port coupled to an antenna of the plurality of antennas, the passive network configured to provide a signal at an input port to an output port, and a plurality of switches coupled to the high-power signal cable, each switch coupled to an input port in the plurality of input ports, the plurality of switches to selectively couple the transmission signal conveyed by the high-power signal cable to the plurality of input ports based on a control signal; and a control unit coupled to the plurality of switches, the control unit configured to produce the control signal based on a specified coupling of the high-power signal cable to the plurality of antennas;

wherein the communications system is installed at least in part on a communications tower, wherein the radio frequency circuit is installed at or near the top of the communications tower, and wherein the signal amplifier is installed at or near the bottom of the communications tower.

2. The communications system of claim 1, wherein the plurality of switches selectively couples the transmission signal to a single input port or to all input ports in the plurality of input ports.

3. The communications system of claim 2, wherein when the plurality of switches couples the transmission signal to all input ports in the plurality of input ports, the transmitted signal transmitted by the plurality of antennas has an omni-directional transmission pattern.

4. The communications system of claim 1, wherein the passive network comprises a Butler matrix.

5. The communications system of claim 4, wherein the number of input ports in the plurality of input ports is equal to the number of output ports in the plurality of output ports.

6. The communications system of claim 1, wherein each antenna in the plurality of antennas comprises antenna elements, and wherein the antenna elements comprise omni-directional elements or directional elements.

7. The communications system of claim 1, wherein the plurality of antennas comprises a set of first polarization polarized antennas and a set of second polarization polarized antennas, and the passive network comprises:

a first passive network having a plurality of first output ports and a plurality of first input ports, with each first output port coupled to an antenna in the set of first polarization polarized antennas, the first passive network configured to provide the transmission signal at a first input port to a first output port; and a second passive network having a plurality of second output ports and a plurality of second input ports, with each second output port coupled to an antenna in the set of second polarization polarized antennas, the second passive network configured to provide the transmission signal at a second input port to a second output port.

8. The communications system of claim 7, wherein the plurality of switches comprises:

a diversity switch coupled to the high-power signal cable and to the control unit, the diversity switch configured to selectively couple the transmission signal to the first passive network or the second passive network based on the control signal;

a plurality of first switches coupled to the diversity switch and to the first passive network, the plurality of first switches to selectively couple the transmission signal conveyed by the high-power signal cable to the plurality of first input ports based on the control signal; and a plurality of second switches coupled to the diversity switch and to the second passive network, the plurality of second switches to selectively couple the transmission signal conveyed by the high-power signal cable to the plurality of second input ports based on the control signal.

9. The communications system of claim 7, wherein the high-power signal cable comprises:

a first high-power signal cable coupled to a first signal amplifier and to the first passive network, the first high-power signal cable to convey a first transmission signal produced by the first signal amplifier; and a second high-power signal cable coupled to a second signal amplifier and to the second passive network, the second high-power signal cable to convey a second transmission signal produced by the second signal amplifier.

10. The communications system of claim 9, wherein the diversity switch selectively couples the first transmission signal to the first passive network and the second transmission signal to the second passive network.

11. The communications system of claim 7, wherein the antennas in the set of first polarization polarized antennas and the set of second polarization polarized antennas comprise cross-polarized antennas or X-polarized antennas.

12. A method for operating a base station in a wireless communications system having a mobile station, the method comprising:

setting a plurality of antennas in a widebeam mode;

transmitting control information using the plurality of antennas;

selecting a narrow beam setting for the plurality of antenna, wherein the narrow beam setting is selected from a sequence of narrow beam settings;

setting the plurality of antennas in the selected narrow beam setting;

transmitting a transmission using the plurality of antennas set in the selected narrow beam setting; and repeating the selecting a narrow beam setting, the setting the plurality of antennas in the selected narrow beam setting, and the transmitting a transmission using the plurality of antennas for remaining narrow beam settings in the sequence.

13. The method of claim 12, further comprising monitoring for transmissions using the plurality of antennas set in the selected narrow beam setting.

14. The method of claim 13, wherein the repeating further comprises repeating the monitoring for transmissions using the plurality of antennas for remaining narrow beam settings in the sequence.

15. The method of claim 12, further comprising:

selecting a second narrow beam setting for the plurality of antenna, wherein the second narrow beam setting is selected from a second sequence of narrow beam settings;

setting the plurality of antennas in the second selected narrow beam setting;

monitoring for transmissions using the plurality of antennas set in the second selected narrow beam setting; and repeating the selecting a second narrow beam setting, the setting the plurality of antennas in the second selected narrow beam setting, and the monitoring for transmissions using the plurality of antennas for remaining narrow beam settings in the second sequence.

16. The method of claim 15, wherein the sequence and the second sequence are identical.

17. The method of claim 12, further comprising:
resetting the sequence; and
repeating the setting a plurality of antennas in a widebeam mode, the transmitting control information, the selecting a narrow beam setting, the setting the plurality of antennas in the selected narrow beam setting, and the transmitting a transmission using the plurality of antennas for each narrow beam setting in the sequence.

18. A method for operating a mobile station in a wireless communications system having a plurality of base stations, the method comprising:
measuring a channel quality indicator (CQI) from transmissions received at an antenna of the mobile station, wherein transmissions made by base stations in the wireless communications system are made synchronously and a sequence of antenna patterns used for transmission is known by the mobile station and the plurality of base stations;
selecting a time slot having a best CQI;
transmitting information regarding the selected time slot to the base station; and
monitoring the selected time slot for transmissions from the base station.

19. The method of claim 18, wherein the selecting a time slot comprises selecting a time slot with a largest measured CQI.

20. The method of claim 18, wherein a CQI history is maintained, and wherein the selecting a time slot comprises selecting a time slot with a largest measured CQI over time.

21. The method of claim 18, wherein the measuring a CQI comprises averaging a measured CQI over time.

22. A communications system comprising:
a baseband unit configured to process transmitted and received signals at a baseband frequency;
a signal amplifier coupled to the baseband unit, the signal amplifier configured to amplify a transmission signal produced by the baseband unit;
a radio frequency circuit coupled to the signal amplifier by a high-power signal cable, the radio frequency circuit configured to transmit an amplified transmission signal produced by the signal amplifier, the radio frequency circuit comprising:
a passive network having a plurality of output ports and a plurality of input ports, each output port coupled to an antenna in a plurality of antennas, the passive network configured to provide a signal at an input port to an output port, and
a plurality of switches coupled to the high-power signal cable, each switch coupled to an input port in the plurality of input ports, the plurality of switches to selectively couple the amplified transmission signal conveyed by the high-power signal cable to the plurality of input ports based on a control signal; and
a control unit coupled to the plurality of switches and to the baseband unit, the control unit configured to produce the control signal based on a specified coupling of the high-power signal cable to the plurality of antennas provided by the baseband unit;
wherein the radio frequency circuit and the control unit are located in close proximity with each other and far away from the baseband unit and the signal amplifier.

23. The communications system of claim 22, wherein the plurality of switches selectively couples the transmission signal to a single input port or to all input ports in the plurality of input ports.

24. The communications system of claim 22, wherein the control unit is coupled to the baseband unit by a low voltage signal cable.

25. The communications system of claim 22, wherein the radio frequency circuit is further configured to receive signals on at least one antenna in the plurality of antennas, the communications system further comprising a low noise amplifier coupled to the baseband unit and to the high-power signal cable, the low noise amplifier configured to amplify a received signal conveyed by the high-power signal cable.

26. The communications system of claim 22, further comprising the high-power signal cable coupled between the radio frequency circuit and the signal amplifier.

* * * * *